June 14, 1927.
G. W. FARMER
STATION INDICATOR
Filed May 24, 1926
1,632,465
3 Sheets-Sheet 1
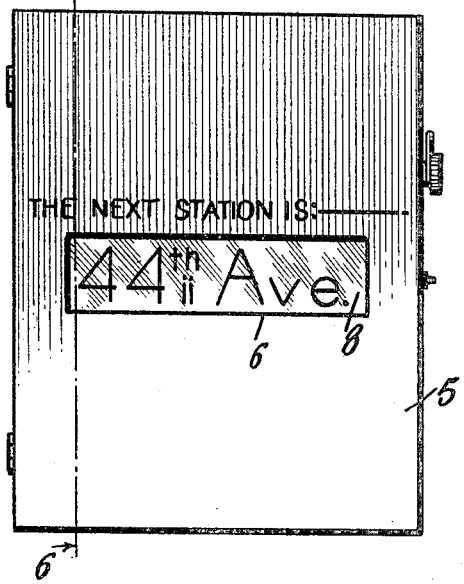
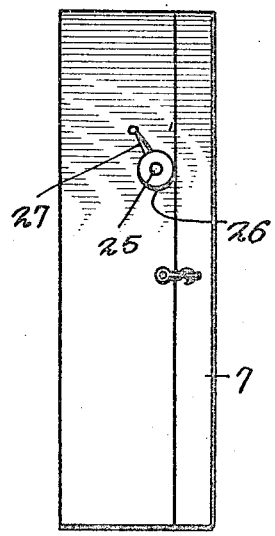
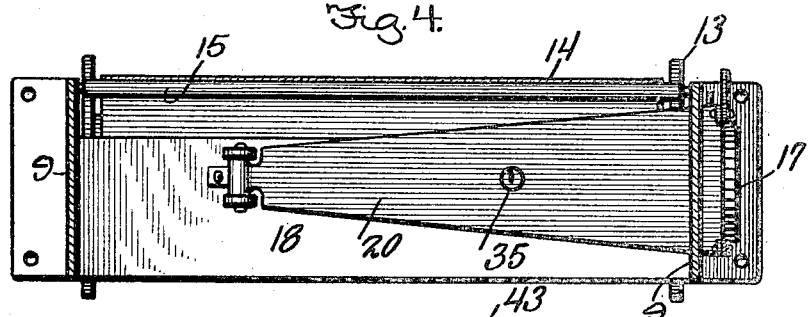
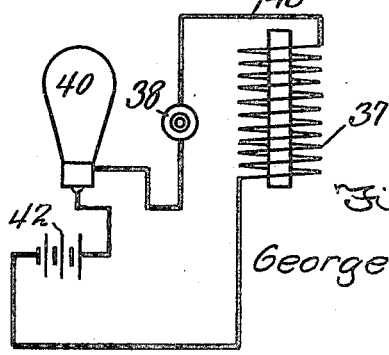
George W. Farmer, Inventor

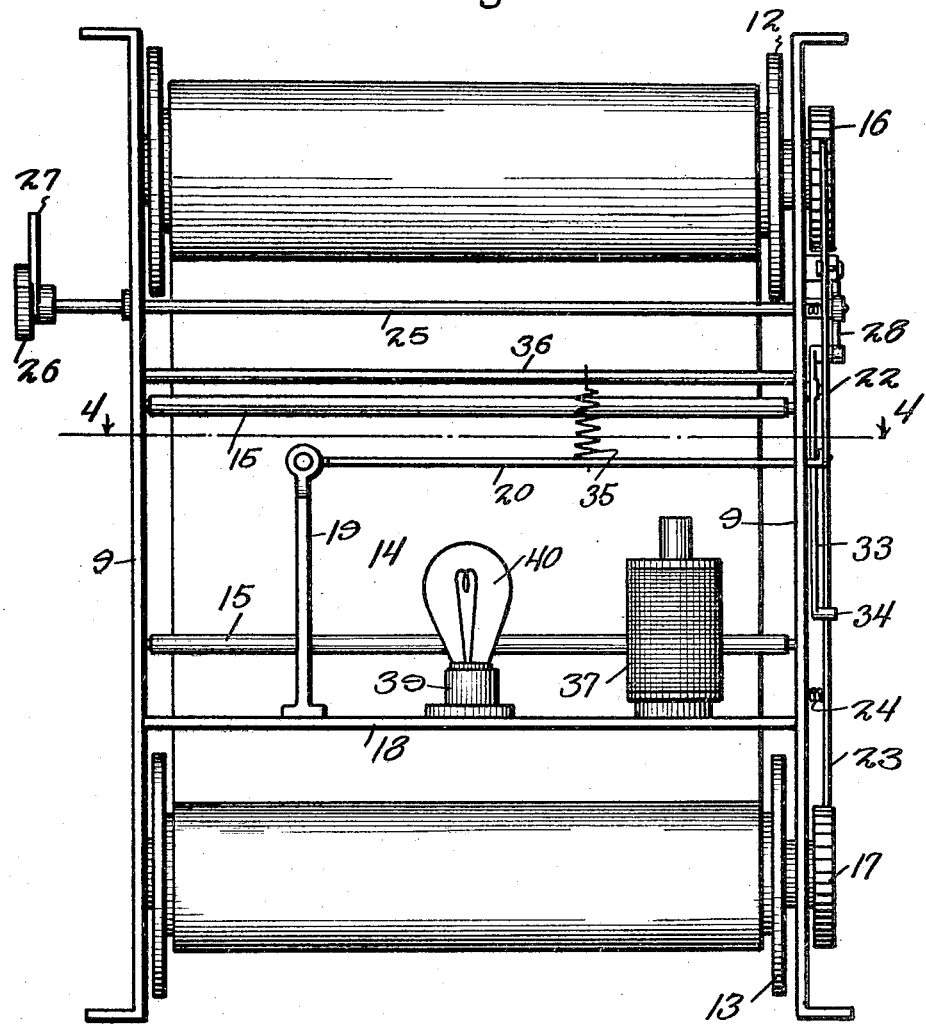

June 14, 1927.

G. W. FARMER

STATION INDICATOR

Filed May 24, 1926

Witnesses
C. E. Churchman
J. Stanley Bond

George W. Farmer,
Inventor

By Richard B. Owen
Attorney

Patented June 14, 1927.

1,632,465

UNITED STATES PATENT OFFICE.

GEORGE W. FARMER, OF OAKLAND, CALIFORNIA.

STATION INDICATOR.

Application filed May 24, 1926. Serial No. 111,459.

This invention relates to certain new and useful improvements in changeable exhibitors, and has more particular reference to a device of this kind particularly serviceable for use as a station or street indicating device for cars and other public vehicles.

The present invention has for its primary object to provide a device of the above character which embodies novel features of construction whereby a web carrying the names of the stations or intersecting streets or stopping places can be given a step by step movement so that the name of each street or stopping place will be displayed at the proper time to enable the passengers on the car or vehicle to get off at the proper street without difficulty.

Further objects of the invention are to provide a street or station indicator which is simple and durable in construction and efficient in operation, and which can be readily set to reverse the direction of movement of the web at the end of the route.

A specific object of the invention is to provide a street or station indicator embodying a pair of reels, a web carrying the names of the stopping places and adapted to be wound from one reel onto another and vice versa, and manually controlled means for effectively rotating either desired reel whereby travelling movement of the web will be caused in the desired direction.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views.

Figure 1 is a front elevational view of a street or station indicator constructed in accordance with the present invention;

Figure 2 is a side elevational view thereof looking toward the left of Figure 1;

Figure 3 is a rear elevational view of the device shown in Figure 1, drawn on an enlarged scale, and with the casing removed;

Figure 4 is a horizontal section taken substantially upon line 4—4 of Figure 3;

Figure 7 is a wiring diagram showing the manner of including the electro-magnet and web illuminating lamp in a suitably controlled electric circuit with a source of electricity.

Figure 5:
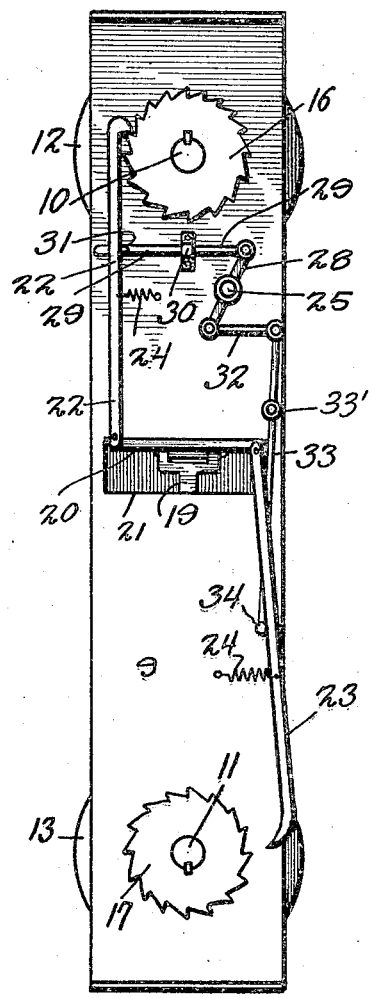
Figure 5 is a side elevational view of the device shown in Figure 3 looking toward the left of the latter figure.

Referring more in detail to the drawings, the present invention embodies a suitable casing 5 having a central horizontally elongated view opening 6 in the front thereof and provided with a rear closure section or door 7 provided with suitable means for releasably holding the same in closed position as shown in Figure 2. A transparent panel or window 8 is secured and fitted in the view opening for obvious purposes.

Suitably fitted and secured within the casing 5 is a supporting frame including a pair of spaced upright frame plates 9 respectively disposed adjacent the opposite sides of the casing. Respectively journaled in the top and bottom of the frame are horizontal shafts 10 and 11 upon which reels 12 and 13 are respectively secured, and these reels are of such length as to extend from one frame plate 9 to the other as shown clearly in Figure 3. A flexible translucent web 14 having the names of the stations or streets suitably provided thereon is arranged within the casing and has its ends respectively attached to the reels 12 and 13 so that when one reel is rotated in one direction and the other reel allowed to freely rotate in the same direction, the web will be wound upon the first named reel and off of the second named reel and vice versa. The forward edge portions of the upright frame plates 9 are rigidly connected by a pair of spaced horizontal rods respectively disposed above and below the view opening 6 directly behind the front wall of the casing, and journaled upon these rods are anti-friction rollers or sleeves 15 in front of which the web 14 moves so that the exhibited portion of the web is effectively maintained in proximity to the view opening or window and free movement of the web facilitated.

The shafts 10 and 11 of the reels project through a frame plate 9 at one side of the frame and have ratchet wheels 16 and 17 respectively fixed thereon outwardly of said frame plate. A horizontal shelf or supporting plate 18 rigidly connects the frame plates 9 directly above the lower reel 13 as shown clearly in Figures 3 and 6, and rigid with and projecting upwardly from this supporting plate or shelf 18 is an upright or post 19 to the upper end of which is pivotally connected one end of a vertically swinging actuating lever 20 that projects laterally to and through the frame plate 9 adjacent which the ratchet wheels 16 and 17 are positioned, the said frame plate 9 being provided with a slot 21 through which the lever 20 projects as shown clearly in Figure 5. Pivoted to the free end of the actuating lever 20 are a pair of pawls 22 and 23 which respectively project upwardly to the ratchet wheel 16 and downwardly to the ratchet wheel 17 as is also shown in Figure 5, said pawls being normally yieldingly swung toward and in operative relation to the ratchet wheels 16 and 17 by means of helical tension springs or the like as indicated at 24. It is thus apparent that upon vertical swinging movement of the actuating lever 20, first in one direction and then in the other, the pawl 22, if allowed to assume an operative relation to the ratchet wheel 16 while the pawl 23 is held out of operative relation with the ratchet wheel 17, will effect a step by step rotation of the upper reel 12 to cause the web 14 to be wound thereon and to be at the same time unwound from the lower reel 13, while, upon rendering the pawl 22 inoperative and permitting the pawl 23 to assume an operative position, the ratchet wheel 17 will be actuated for rotating the lower reel 13 in the opposite direction so as to cause the web 14 to undergo a step by step movement in winding upon the lower reel 13 and off of the upper reel 12. Obviously, the direction of movement of the web will be determined by the direction of travel of the vehicle upon which the station indicator is installed, the direction of movement of the web being reversed at each end of the route. Manually controlled means is provided for rendering either desired pawl inoperative and at the same time permitting the other pawl to assume an operative position, and such means preferably embodies a transverse rock shaft 25 journaled horizontally in the frame plates 9 and having one end projecting outwardly through a side of the casing 5 and provided with an actuating knob 26 having an indicating hand or pointer 27, the other end of the shaft 25 terminating below the upper ratchet wheel 16 and having a double arm lever 28 fixed thereon. One arm of the lever 28 has a push rod 29 pivoted thereto, and this push rod 29 slidably projects through a suitable guide 30 fixed to the adjacent frame plate 9 as shown in Figure 5, the free end portion of the push rod 29 being provided with a lateral projection or pin 31 arranged to engage against the inner side of the pawl 22. The other arm of the lever 28 is operatively connected by means of a link 32 with one end of a lever 33 which is pivoted at 33' intermediate its ends upon the adjacent frame plate 9 and which has a lateral pin or projection 34 rigid with the free lower end thereof and arranged to engage the inner side of the lower pawl 23. It is thus apparent that when the rock shaft 25 is turned in one direction the push rod 29 is actuated to force the pawl 22 to an inoperative position away from the associated ratchet wheel 16 against the action of the associated spring 24, the lever 33 being at the same time swung so as to move the projection 34 away from the pawl 23 and allow the associated spring 24 to swing said pawl 23 toward and in operative relation to the ratchet wheel 17. In a like manner, turning of the rock shaft 25 in the opposite direction will effect movements of the push rod 29 and lever 33 so as to allow the pawl 22 to return to operative position and cause the pawl 23 to swing to an inoperative position. Suitable indicating lines or the like may be provided upon the adjacent side of the casing 5 for association with the pointer 27 as indicated in Figure 2 so that the conductor or motorman may readily ascertain which pawl is operatively disposed and thereby determine in what direction the web 14 will move when the actuating lever 20 is swung back and forth. As shown, the pawls 22 and 23 are arranged at opposite sides of the ratchet wheels 16 and 17 and said ratchet wheels are reversely arranged so that the pawl 22 will cause rotation of the ratchet wheel 16 and upper reel 12 in one direction upon downward movement of the same, while the pawl 23 will cause rotation of the ratchet wheel 17 and lower reel 13 in the opposite direction upon its downward movement. It is to be understood that the lever 20 is moved for a sufficient distance to cause the pawls 22 and 23 to turn the reels 12 and 13 a sufficient degree for causing the web 14 to travel such distance as is necessary to move the name of one station or stopping place from registry with the view opening and to move the next succeeding station name or stopping place in view behind said opening upon each actuation of said lever 20 in a downward direction, the upward movement of the lever 20 being of an idling nature to reset the pawls for the next actuation of the ratchet wheels.

Figure 6:
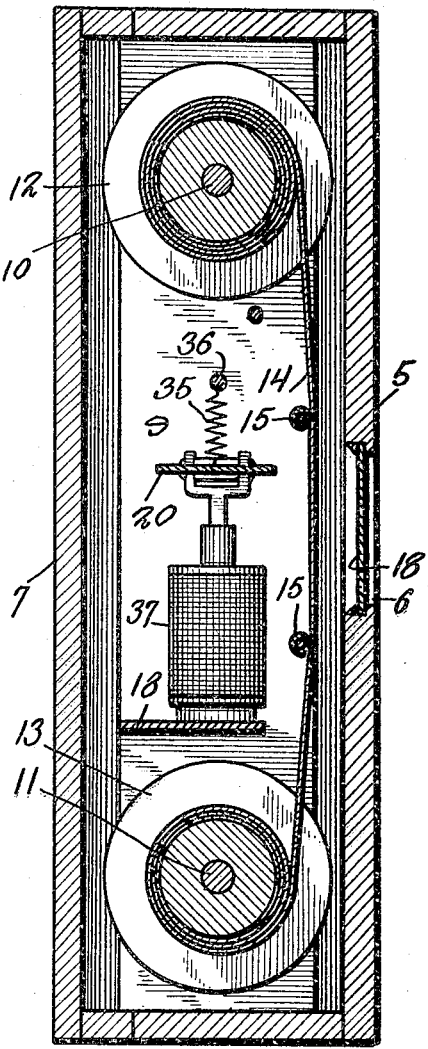
Figure 6 is a vertical section taken substantially upon line 6—6 of Figure 1 and drawn on an enlarged scale.

The lever 20 is normally swung upwardly by means of a helical tension spring 35 which has its upper end anchored to a horizontal transverse rod 36 connecting the frame plates 9 above the lever 20, and which has its lower end attached to the lever 20 as shown clearly in Figures 3 and 6. In order to effect the downward movement of the lever 20 for actuation of the respective ratchet wheels, I prefer to provide an electro-magnet 37 which is rigidly mounted upon the supporting plate or shelf 18 beneath the free end portion of the lever 20 so as to be capable of attracting said lever when energized and thereby swinging the lever downwardly against the action of the spring 35. The electro-magnet is preferably included in a circuit controlled by a push button 38 or other suitable switch as shown in Figure 7, such switch being located within convenient reach of the conductor or motorman of the vehicle. In this way the switch 38 may be closed between stopping places for energizing the electromagnet 37 and causing the downward movement of the lever 20 for advancing the web 14 the distance necessary to bring the next succeeding stopping place in position behind the view opening 6. As soon as the push button or switch 38 is released or opened, the electro-magnet 37 will be de-energized and the spring 35 will return the lever 20 to normal upwardly swung position for re-setting the operative pawl for the next succeeding stroke or actuating effect upon the associated ratchet wheel. Suitably mounted in a socket 39 fixed upon the supporting plate 18 is an incandescent lamp 40 adapted to be lighted for illuminating the web 14 and rendering the names of the stations readily visible to the passengers. As shown in Figure 7 this lamp 40 may be included in a circuit in series with the electro-magnet 37 so as to be lighted when the electro-magnet is energized and thereby attract the attention of the passengers upon each actuation of the web. However, it is obvious that the lamp 40 may be included in a circuit controlled by a switch separate from the switch 38 so that the same may be lighted and allowed to remain lighted at all times independently of the operation of the switch 38, said switch 38 being then solely used for the energization of the electro-magnet 37. Referring to Figure 7 in detail, it will be seen that one side of the electro-magnet 37 is connected by means of a wire 41 with one side of the source of electricity such as the battery 42 whose other side is connected to one terminal of the lamp 40, the other terminal of the lamp 40 being connected to one terminal of the switch 38, and the other terminal of the switch 38 being connected to the other side of the electro-magnet 37 by means of a wire 43.

With the parts positioned as shown in the drawings, it will be seen that when the push button 38 is actuated the electro-magnet 37 will be energized for swinging the actuating lever 20 downwardly and thereby causing the pawl 22 to effect a partial rotation of the upper reel 12 so as to cause upward travel of the web 14 for bringing the next succeeding station name in view behind the view opening 6. When the push button 38 is then released for breaking the circuit of the electro-magnet 37, the latter will be de-energized so as to release the lever 20 and allow the spring 35 to swing said lever 20 upwardly to its normal position. In this way the pawl 22 is raised for being re-set or positioned ready for its next actuating influence upon the ratchet wheel 16. During this swinging movement of the lever 20 the pawl 23 will reciprocate without engaging the ratchet wheel 17 or influencing the lower reel 13 by reason of the fact that said pawl 23 is maintained out of engagement with the ratchet wheel 17 by the lug 34 on the lever 33. When the vehicle reaches the end of the route in one direction of travel, the conductor or motorman will rock the shaft 25 so as to swing the pawl 22 away from the ratchet wheel 16 and maintain the same in an inoperative position relative to the ratchet wheel 16, and at the same time swinging the lever 33 so that the pawl 23 may swing inwardly into operative relation with the ratchet wheel 17 under the influence of the associated spring 24. Upon the return trip of the vehicle the energization of the electro-magnet 37 will then obviously effect actuation of the ratchet wheel 17 for causing the web 14 to travel step by step in a downward direction so that the names of the stations are properly brought to view in the proper sequence.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. In a station indicator, an upright frame, reels respectively journaled in the frame at the top and bottom of the latter, a vertically swinging actuating lever pivoted in the frame between said reels and projecting outwardly through one side of the frame, ratchet wheels rigid with the reels outwardly of said side of the frame, a pair of pawls pivoted to the projecting end of the actuating lever and extending to the respective ratchet wheels, yieldable means to normally swing the pawls toward and in operative relation to the respective ratchet wheels, and manually operable means for swinging either desired pawl to an inoperative position away from the associated ratchet wheel and simultaneously allowing the other pawl to swing toward and in operative relation with the associated other ratchet wheel.

2. In a station indicator, an upright frame, reels respectively journaled in the frame at the top and bottom of the latter, a vertically swinging actuating lever pivoted in the frame between said reels and projecting outwardly through one side of the frame, ratchet wheels rigid with the reels outwardly of said side of the frame, a pair of pawls pivoted to the projecting end of the actuating lever and extending to the respective ratchet wheels, yieldable means to normally swing the pawls toward and in operative relation to the respective ratchet wheels, and manually operable means for swinging either desired pawl to an inoperative position away from the associated ratchet wheel and simultaneously allowing the other pawl to swing toward and in operative relation with the associated other ratchet wheel, said last named means embodying movable actuating elements engaging the inner sides of the pawls and a manually operable operating connection between said actuating elements for effecting release of either desired one of the latter from the adjacent pawl and simultaneously forcing the other actuating element against the other pawl.

3. In a street or station indicator, a pair of reels journaled horizontally in superposed spaced relation, a web carrying the names of the streets or stations and attached to and extending between said reels, a vertically swinging actuating lever mounted between the reels, a pair of ratchet wheels respectively rigid with the respective reels, a pair of oppositely projecting pawls pivoted to the lever and extending along side the respective ratchet wheels for movement toward and away from the latter, yieldable means acting to normally swing the pawls toward the ratchet wheels, a push rod slidably mounted adjacent one pawl and engaging the inner side of the latter, a lever pivoted intermediate its ends and having one end engaging the inner side of the other pawl, and a manually operable rock shaft operatively connected to the push rod and the lever for simultaneously effecting movement of said push rod and lever whereby either pawl may be swung away from its associated ratchet wheel and the other pawl allowed to swing toward the other associated ratchet wheel.

4. In a structure of the character described, a pair of spaced parallel reels, a ratchet wheel fixed to one end of each of said reels, an actuating arm lying between said reels having one end pivotally secured to enable the free end thereof to swing vertically, a pair of rigid arm members extending in opposite directions from the free end of said actuating arm and formed at their free ends to set up ratchet engaging pawls, means normally acting to draw said pawls toward an adjacent ratchet wheel, means for causing the free end of said actuating arm to swing downwardly at will for the actuation of said pawls, and a pawl control mechanism comprising a horizontally arranged shiftable arm having means for engaging one of said arm members, a swinging arm arranged to extend at right angles to said horizontal arm and pivoted intermediate its ends, a finger member carried at one end of said swinging arm and engaging one side of the other of said pawls, and oscillating means connected with said horizontal arm and said swinging arm for simultaneously actuating the two arms, said horizontal arm, when moved toward its adjacent pawl acting to disengage the same from the adjacent ratchet and said pivoted arm being simultaneously moved to release its adjacent pawl for engagement with the adjacent ratchet.

In testimony whereof I affix my signature.

GEORGE W. FARMER.